March 8, 1927.
W. P. KENNEDY
1,619,941
MOTOR VEHICLE
Filed May 25, 1925
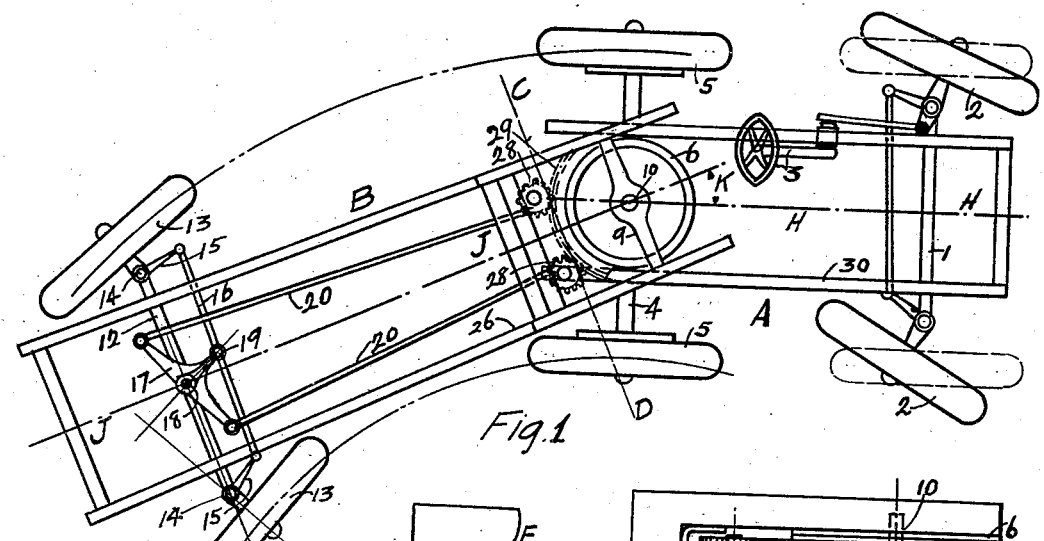
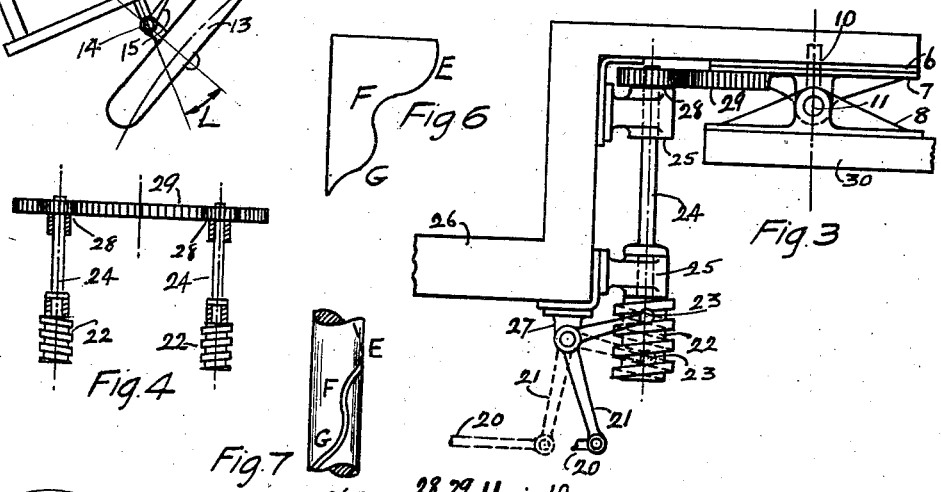
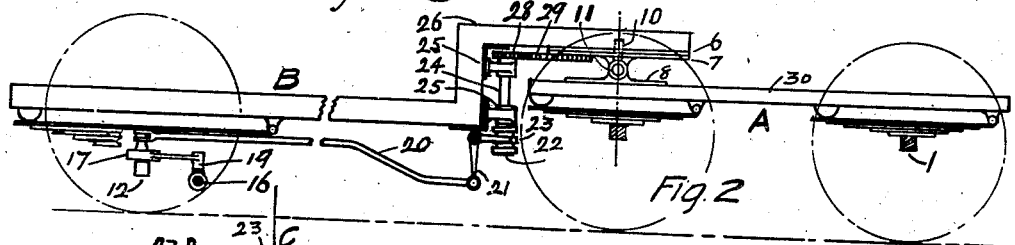
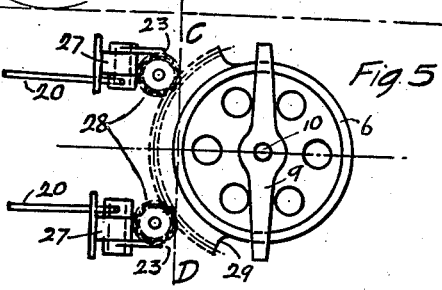
INVENTOR
William P. Kennedy.

Patented Mar. 8, 1927.

1,619,941

UNITED STATES PATENT OFFICE.

WILLIAM P. KENNEDY, OF NEW YORK, N. Y.

MOTOR VEHICLE.

Application filed May 25, 1925. Serial No. 32,664.

This invention relates to various novel features of steering equipment embodied in motor vehicles having two or more sections combined to form an operating unit, particularly exemplified in tractor and semi-trailer vehicles, in which it is desirable to effect improvement towards making the rear or trailing portion of the vehicle follow the forward or tractor part in a definite path, the importance of which increases in proportion to the lengthening of such vehicles and is accentuated under congested traffic conditions in cities and in going around short curves on rural highways.

Among the objects of this invention when applied to a tractor united to a semi-trailer constituting a unit vehicle are—to provide for the steering movement of the rear or trailer wheels controlled by the turning movements of the tractor part of the vehicle with relation to the trailer part, and also to provide that the changing steering movements of the rear wheels shall be varied in unequal degrees for equal angular changes of the tractor with relation to the trailer in the general steering movement of the vehicle, and further to insure that the path of the trailer wheels shall follow a predetermined course which shall be different for different lengths of vehicles governed by a steering mechanism actuated by changing angularity between the tractor and trailer. Another object of this invention is to provide in a six wheel vehicle of the tractor and semi-trailer type a steering movement of all six wheels which shall be automatic in response to the initial angular movement given to the front wheels by turning a single wheel mounted on a conventional steering post in the hands of an operator, the path of the rear wheels following a predetermined course in a manner to insure that the rear part of the vehicle shall follow the path taken by the front part, particularly in passing through openings or narrow spaces, provision being made in the steering equipment of such a vehicle for its particular overall length. A further object is to provide in a vehicle of the type referred to that when passing from one street to another at right angles or in turning a sharp right angle corner, the turning movement of the rear wheels shall be so delayed until they have advanced forward to the position at which the rear axle of the tractor commenced its turning movement around such a corner, the purpose of this delayed steering being to prevent the trailer axle and wheels in such an instance taking a short cut around the corner as would be the case in a conventional vehicle of this type not provided with such steering equipment as is covered by this invention.

A still further purpose of such delayed trailer steering is to enable a long vehicle of the type described to make a short radius turning around a right angle corner, thus avoiding the necessity of the tractor having to make a wide circuit to insure the clearance of the rear end of the vehicle from contact with such a right angle corner. Such a steering equipment in the type of vehicle referred to will insure that a long vehicle in passing another on the short or sharp curves of a highway will not sideswipe with its rear end the passing vehicle, but will adhere to the path or course taken by the front end of the vehicle in making such a turn. An additional advantage in the use of the steering equipment covered by this invention is that the rear or trailer axle may be placed close to the rear end of the body of the vehicle and thus eliminate the overhang of the body beyond the rear axle now customary in conventional vehicles, and particularly in motor buses or large passenger capacity. These and other objects it is aimed to accomplish jointly and separately as will appear from the detailed description hereinafter set forth.

Under the current development taking place in the application of motor vehicles to freight and passenger transportation in congested cities and over interurban highways, there is an increasing trend towards the use of larger capacity vehicles operated by a single driver with the object of transporting a greater quantity of freight or an increased number of passengers with a reduced outlay for operator's expense, and to effect concentration and reduce traffic congestion. In accomplishing these purposes, vehicles of the conventional design having a steering axle in front and a load carrying axle near the rear have been materially increased in wheelbase and body capacity. Under this procedure in such vehicle enlargement increased load has been imposed upon the rear axle until the carrying capacity of the largest conventional load axles have been exceeded and resort has been had to various improvements in design and construction, one of which has been the employment of two rear load axles placed relatively close to each other. Another development has been the employment of a short wheelbase tractor having attached thereto a semi-trailer for carrying the load, the front end of such trailer being attached near the rear end of the tractor by means of a swiveling fifth wheel connection. The increased overall length of vehicle resulting from such practices has introduced steering problems in effecting the short turning of such vehicles. In the former type of development just referred to increased turning facility has been sought by increasing the steering angle of the front axle steering wheels which has provided a limited form of remedy. In the tractor semi-trailer type of vehicle recourse has been had to the employment of a steering axle towards the rear end of the trailer. In some instances this takes the form of a rigid or straight axle connected to the body of the vehicle by a fifth-wheel so that this rear axle as a whole may turn in its steering movements. This practice is exemplified in fire fighting apparatus where such a rear steering axle is manipulated by a special operator. In other instances such an axle has been made to turn in its steering movements by connection with the tractor, the change in steering movement resulting from angular changes taking place between the tractor and the semi-trailer. In other instances a steering axle of the pivoted wheel type similar to that conventionally employed at the front of automobiles has been applied to the rear end of such semi-trailers, the steering movements of the pivoted wheels being controlled by rods and lever connections to the tractor part so that in the general steering of the vehicle the angular changes taking place between the tractor and the trailer have been made use of to operate the rear steering wheels by the direct mechanical connections referred to.

In all these improvements there is a remaining defect resulting in the fact that the rear wheels, and more particularly the rear body part of the vehicle, moves through a path or course in following the forward part of the vehicle which is materially different from that taken by the front part, and this is particularly accentuated in comparing the course of the rear part of the vehicle with that of the fore part in turning around a sharp right angle turn with the tractor and semi-trailer type of vehicle. This is due to the lack of any provision introduced between the tractor and the semi-trailer for varying the ratio of angular movement of the rear steering wheels with relation to the angular movement of the tractor with the trailer, which remains constant in so far as the dimensions of the leverage system employed in these connections remain constant. This condition is aggravated when the same steering connection system is employed in vehicles having different lengths of wheelbase between the rear axle of the trailer and the rear axle of the tractor.

My invention consists of introducing into such a fixed or invariable system of steering connection a varying leverage mechanical movement for changing the angular ratio referred to, and which means in one of its forms may consist of a cam and lever mechanical movement so constructed that a varying movement of the lever may be produced by a rotating cam in contact therewith, the contour of which cam to be designed in relation to the desired rear steering wheel movement at the different points of its rotation, and the rotation of this cam to be effected by the turning or angular movement of the tractor with relation to the trailer.

The particular location of this variable motion mechanism is immaterial and it may be placed either in the forward part of the trailer in proximity to the connection between the tractor and the trailer, or it may be located on the rear axle adjacent to the steering wheels.

The best known embodiment of my invention is shown in the accompanying drawing, in which:

Fig. 1 is a plan view of a running gear of an automobile tractor connected by a fifth-wheel to a semi-trailer running gear, constituting together a six wheel unit vehicle, and showing also the steering arrangements.

Fig. 2 is a side elevation of the same tractor and semi-trailer running gear illustrating the connections between them.

Fig. 3 illustrates in side view and in detail a steering gear mechanism mounted on the semi-trailer rotated by gearing mounted upon the tractor fifth-wheel connection to the semi-trailer.

Fig. 4 is a vertical illustration of the rotating steering gear cams geared to a rotating sector by which they are actuated and which appear in Fig. 3; this being a transverse view taken across the line C—D of Figs. 1 and 5.

Fig. 5 is a plan view of the gearing connections between the tractor and trailer for operating the steering mechanism of the trailer shown vertically in Fig. 3.

Fig. 6 is a diagrammatic illustration in a flat plane of a steering gear cam having a curved profile indicating the contour of its working surface.

Fig. 7 is a diagrammatic illustration of the cam shown in Fig. 6 wrapped around a cylinder to indicate the contour of the cam face in spiral form, or a corresponding spiral groove cut into the cylinder.

Similar numerals refer to similar parts throughout the several views.

As illustrated, the unit shown in Figs. 1 and 2, and the connections between the tractor and trailer elements of this unit separately illustrated in Fig. 3, has the automobile tractor running gear A and semi-trailer running gear B. The tractor A has a front axle 1 with steering wheels 2, mounted as commonly used on automobiles, governed and controlled by the conventional steering post and handwheel 3, and a driving axle 4 with driving wheels 5 mounted thereon. The tractor A is connected to the semi-trailer B through a fifth-wheel mechanism 6, 7 and 8, more particularly illustrated in Fig. 3, 6 being a top ring having a cross plate 9 carrying king bolt or pivot 10 as shown in Fig. 1 and more particularly in Fig. 5, the pivot 10 fitting into a central opening in base plate 7. These parts 6 and 9 are attached to the semi-trailer permitting them to swivel horizontally around and upon base plate 7, which is attached to the brackets 8 mounted on the tractor A by means of a rockshaft 11, by which rockshaft mounting the two plates 6 and 7 can be rocked or partially rotated around the horizontal axis of the rockshaft 11. The semi-trailer B is supported in the rear by a steering axle 12 having steering wheels 13 pivoted to axle 12 at vertical pivots 14, the wheels 13 being rotated around vertical pivots 14 by steering levers 15 which are linked together by a cross connecting rod 16 actuated by a rocker arm 17 pivoted at 18 to axle 12, the connection between the cross rod 16 and the rocker arm 17 being made at the pivot 19. The rocker arm 17 is rotated on pivot 18 through longitudinal connecting rods 20 at their forward ends attached to and actuated in a fore and aft movement by bell crank cam lever 21 in contact with rotating cams 22 through a roller 23 or other projection of the cam lever into spiral grooves on rotating cams 22. These cams 22 are of the cylindrical or drum type having grooves resembling a coarse screw thread to be described more particularly in connection with Figs. 6 and 7. These cams 22 are mounted on the vertical shafts 24 supported by bearing brackets 25 mounted on semi-trailer frame 26, the bell crank cam levers 21 aligned with and actuated by rotating cams 22 are also mounted on frame 26 by trunnion brackets 27. Keyed to the vertical shafts 24 at their upper ends are pinions 28 aligned to mesh with the gear sector 29, which sector is a part of base plate 7 of the fifth wheel 6, 7 and 8 attached to the tractor A on its frame 30.

Fig. 4 is a vertical illustration taken across the line C—D, Figs. 1 and 5, showing the relative positions of the cylindrical cams 22, shafts 24 and pinions 28, all of which are mounted on the semi-trailer B aligned to mesh with the actuating gear sector 29 which is mounted on the tractor A, so that when the tractor A is moved with relation to semi-trailer B the motion of the gear sector 29 rotates the pinions 28 which impart a corresponding rotating motion to cylindrical cams 22.

Fig. 5 is a plan view of the geared connections illustrated in Figs. 3 and 4 which shows the gear sector 29, which is mounted on tractor A, meshed with the pinions 28, which are mounted on trailer B, so that when rotary motion is imparted to gear sector 29 by movement of the tractor A with relation to semi-trailer B a corresponding rotary motion is imparted to pinions 28. This plan view illustrates the top ring 6 with its cross plate 9 and pivot 10, superimposed upon base plate 7 from the rear of which projects the gear sector 29 actuating the pinions 28.

Fig. 6 is a flat plane outline of a cam, the working contour E—F—G of which is developed in accordance with the path through which it is desired to have the rear steering wheels 13, Fig. 1, roll in following the path of the driving wheels 5, Fig. 1. This contour E—F—G applied so as to accomplish this purpose as illustrated at 22 in Fig. 3 guides the movement of the bell crank lever 21 which in turn through the connections 20, 17, 16 and 15 as shown in Fig. 1 effects the desired steering movements of the rear steering wheels 13.

For further illustrative purposes the contour E—F—G shown as a plane in Fig. 6 is indicated in cylindrical or drum form in Fig. 7, which working contour is thus made to determine the outline of a grooved spiral path on the surface of a cylinder or drum such as that shown at 22 in Fig. 3, into which one end of the bell crank lever 21 is fitted by means of a roller 23 or other projection from the end of this lever 21 so that the motion produced in the lever 21 is in accordance with the groove on the cylinder or drum 22 whenever the cylinder 22 is rotated to effect this movement.

The steering operations as shown in this particular embodiment of my invention would be as follows:

The tractor A, Fig. 1, having articulated front road wheels 2 and the conventional steering post and handwheel 3, in the hands of an operator can be made to change its angularity with semi-trailer B when moving along a highway, relative motion between the tractor A and semi-trailer B causes the gear sector 29 to rotate the pinions 28 which in turn rotate the cams 22 and thereby impart a vertical motion to the upper part of the bell crank lever 21, the lower end of which simultaneously moves backwards or forward to a degree depending upon the grooved course or path in the rotating cylindrical cams 22. This motion of the bell crank lever 21 is imparted to the rocker arm 17 on the rear axle 12 through the longitudinal connecting rods 20, and the rocker arm 17 through its connection at pivot 19 moves the connecting rod 16 transversely which through steering levers 15 causes the steering wheels 13 to rotate around the vertical pivots 14 thus causing an angular movement in these wheels 13 which is indicated at L, Fig. 1. The steering angular movement of the tractor A with relation to the semi-trailer B is indicated by the angle K shown between the axis H H of the tractor A and the axis J J of the semi-trailer B. If there were no variable means of changing the relation of the angle L to the angle K incorporated in the steering connections between the tractor A and semi-trailer B for each equal increments in the angle K there would be corresponding equal increments in the angle L, but with a means of variation introduced into the steering connections of the semi-trailer B as exemplified in the cam and lever mechanism 22 and 21 this invention provides for a means which will vary the angle L with relation to the angle K in any ratio which may be predetermined, and such predetermination can be based upon the particular path through which it is desired to have the steering wheels 13 pass in following the tractor wheels 5, and this determination in turn would be formulated upon the length of the wheelbase between the tractor driving axle 4 and the semi-trailer axle 12.

While the figures, illustrating a particular embodiment of this invention, show the rear steering axle to be of the pivoted wheel type, axles of other design, such as those performing steering functions by rotation about a central axis, may be employed as elements incorporated in this invention.

This cam and lever type of mechanism has been made use of in the foregoing specifications and drawings as illustrative of the principles of this invention, but it must be understood that other forms of mechanical devices capable of converting equal amounts of movement into corresponding variable amounts of movement may be used, and further that these may be located at different places within the limits of the mechanical connections employed to transmit the actuating movements of the tractor to the trailer steering wheels.

I am aware that prior to my invention cam and lever steering mechanisms have been made and applied to the steering of automobiles and this particular mechanism is not covered by my invention, but what I claim and desire to secure by Letters Patent is:

1. In an automobile consisting of a tractor flexibly connected with a semi-trailer, said semi-trailer equipped with a rear axle having steering wheels mounted on pivots for steering angular movement and a mechanical connection interposed between said tractor and said steering wheels to change the steering angle of said wheels when the angular relation of said tractor to said trailer is changed, means incorporated in said mechanical connection to vary the degrees of angular movement of said steering wheels for equal angular changes in movement of the tractor with relation to the trailer.

2. In an automobile consisting of a tractor flexibly connected with a semi-trailer, said semi-trailer equipped with a rear axle having steering wheels mounted on pivots for steering angular movement and a mechanical connection interposed between said tractor and said steering wheels to change the steering angle of said wheels when the angular relation of said tractor to said trailer is changed, a cam and lever mechanism actuated in said mechanical connection to produce a variable angular change in said steering wheels depending on the contour of the cam in said cam and lever mechanism.

3. In an automobile consisting of a tractor flexibly connected with a semi-trailer, said semi-trailer equipped with a rear axle having steering wheels mounted on pivots for steering angular movement and a mechanical connection interposed between said tractor and said steering wheels to change the steering angle of said wheels when the angular relation of said tractor to said trailer is changed, an oscillating lever mechanism actuated at a variable rate of movement by the contour of a rotating cam rotated in said mechanical connection between the tractor and the steering wheels of the trailer.

4. A steering control system for guiding the rear wheels of semi-trailer vehicles drawn by automotive tractors incorporating a variable motion mechanism to impart varying amounts of angular change to the rear steering wheels of said semi-trailer in response to equal increments of changing angularity between said tractor and semi-trailer.

5. In an automobile consisting of a tractor flexibly connected to a semi-trailer having rear axle wheels arranged for steering through angular changes in relation to said semi-trailer and a mechanical connection interposed between said tractor and said rear axle to transmit relative angular movement between said tractor and said semi-trailer to actuate the steering angular changes of said rear axle and wheels, a variable ratio movement transmission mechanism incorporated in said mechanical connection to produce unequal angular movement of the rear axle and wheels in response to equal angular movement between the tractor and semi-trailer.

In testimony whereof, I have signed my name to this application, this 23rd day of May, 1925.

WILLIAM P. KENNEDY.